Figure 1:
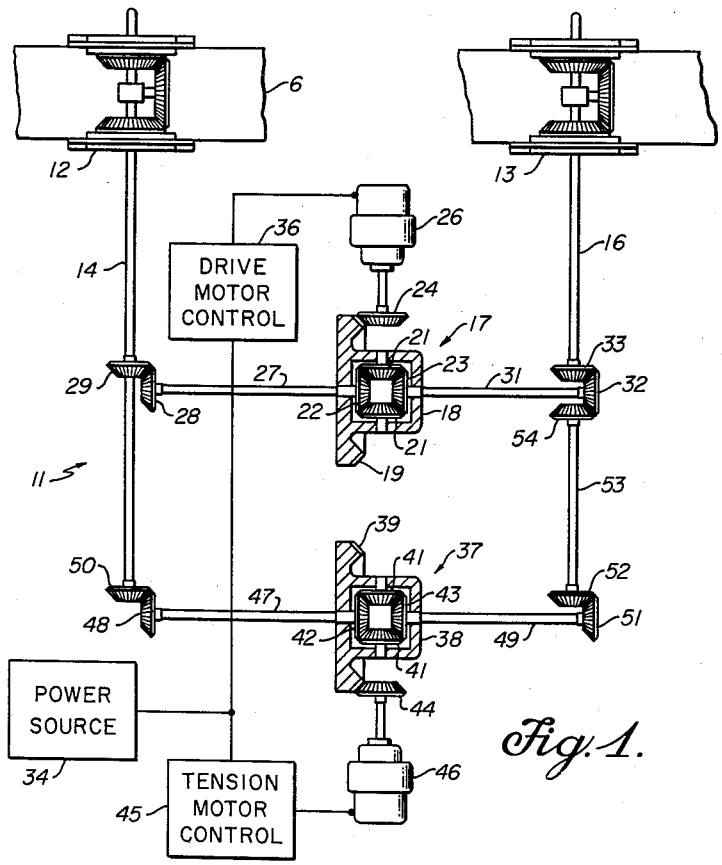

Jan. 28, 1964   R. G. SMITS   3,119,537
MULTIPLE DIFFERENTIAL ROTARY MECHANICAL DRIVE
Filed June 27, 1962   2 Sheets-Sheet 1

INVENTOR.
ROBERT G. SMITS
BY
ATTORNEY.

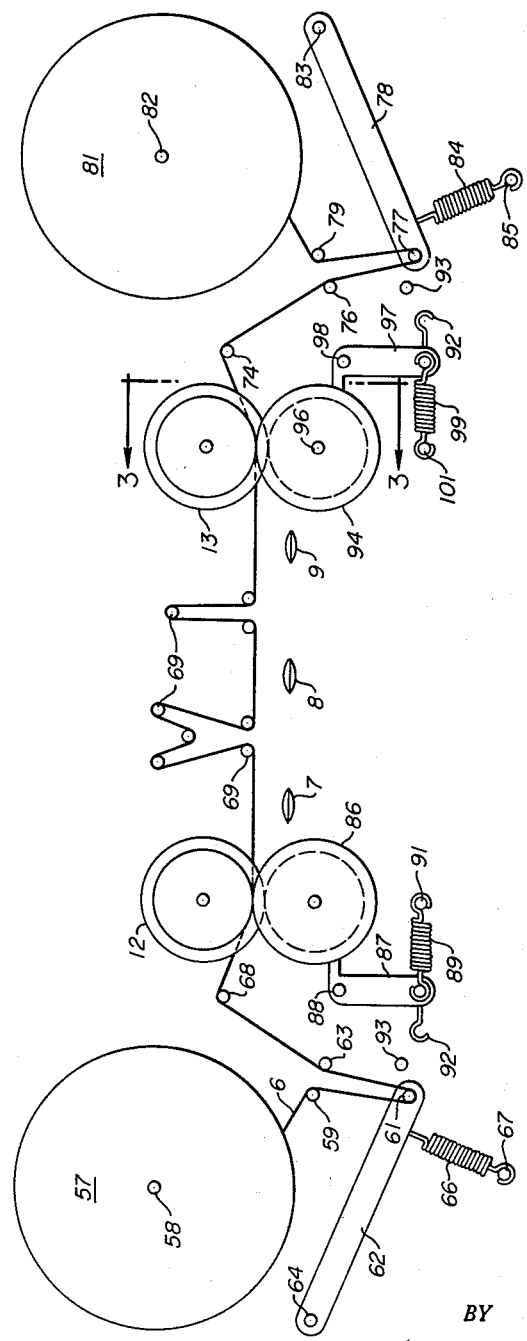

United States Patent Office 3,119,537
Patented Jan. 28, 1964

3,119,537
MULTIPLE DIFFERENTIAL ROTARY
MECHANICAL DRIVE
Robert G. Smits, Lafayette, Calif., assignor to the United States of America as represented by the United States Atomic Energy Commission
Filed June 27, 1962, Ser. No. 205,809
10 Claims. (Cl. 226—111)

This invention relates to rotary mechanical drive systems and more particularly to a mechanism for driving a plurality of spaced apart drums while maintaining a film strip, belt, or the like, which extends between the drums, under constant tension irrespective of starting, running, stopping or reversing of the drums. The invention was designed as a drive system for photographic film strips and provides a multiple differential action for driving two drums to effect accurate and damage free film handling at extremely high speeds.

Certain forms of nuclear particle detector, such as a bubble chamber for example, provide a visible indication of the movement of charged particles within a sensitive medium. The transitory particle tracks are usually photographed for subsequent analysis and customarily large numbers of exposures are made for each nuclear experiment. The desired data is thus initially recorded as a series of exposures on a roll of film which may be of considerable length. The film is produced at a rate exceeding that at which it can be economically analyzed by manual methods and accordingly, automatic film scanning mechanisms have been developed to measure and record the nuclear data. U.S. Patent No. 2,895,053 issued August 11, 1959, to Jack V. Franck et al. for Measuring Projector discloses a typical automatic film scanner of this type. In addition to means for the rapid scanning of the individual nuclear events, such devices require a precision means for moving the film from one view to another and for positioning images in a reasonable minimum of time so that the scanning may be efficiently accomplished. At times it is necessary to move the film back to a previous view and then forward to a subsequent image. Generally the film transport requires slow, medium and high speeds, up to 1000 feet per minute for example, in either forward or reverse directions. Sudden stops and starts are also required with accelerations up to full speed and deceleration from full speed to zero in less than one second and with accurate positioning to within fifteen thousandths of an inch for instance. To avoid damage to the film, the tension thereon must be maintained constant throughout these movements.

The rapid starting and sudden stopping, with reversals of direction of travel and high speeds of travel, taxes the strength of the film quite severely since there is a maximum of pressure per square inch of area that may be applied to the edges of the film in applying accelerating and braking forces. The film must be held snug and tight before viewing positions and in some cases three frames must be accurately positioned simultaneously. In view of these conditions the film must not be allowed to slacken in the viewing area, and must be maintained in tension.

Since roll film may slip, expand or contract slightly, the necessary constant tension cannot be maintained in a drive system where successive pulleys are simply coupled by ordinary gears or belts. As a further requirement it is necessary to keep the film from being pushed rather than pulled. Pushing of the film results in buckling and snapping and may result in tearing.

To meet the foregoing requirements the present invention uses two spaced apart spools, between which the film strip passes, to move the film. The basic drive is provided by a reversible variable speed motor coupled to each of the spools through a first mechanical differential gear assembly, the motor acting to drive both spools in the same direction. To provide the constant tension on the film, a second and independent motor is coupled to each of the two spools through a second differential gear assembly. The second motor is of the constant torque class and is coupled to drive the two spools in opposite directions. The second motor is thus normally stalled. However if slippage, stretching or play in the basic drive causes a change in film tension, the second motor may rotate to maintain tension irrespective of the motion imparted to the spools by the basic drive motor.

As a further means for preventing excess strain on the film and further to eliminate the possibility of scratching critical areas of the film, unique spools are employed which grip the film only along the edges thereof. An additional differential system is provided within each spool, between the film gripping side members thereof, so that any potential skewing of the film on the spool is immediately adjusted.

Therefore it is an object of this invention to provide a transport drive for a film strip or the like which is particularly adapted to operate at low, medium or high speeds with sudden starts and stops without damage to the film.

It is an important object of the present invention to provide a drive system for two spaced drums with which a constant tension may be maintained on a belt, film or the like extending between the drums irrespective of the basic rotary motion thereof.

It is another objective of the present invention to provide a reliable high speed transport drive for a film strip which is reversible and will operate equally well in both directions.

It is a further object of this invention to provide a rotatable drum drive for manipulating film strip which may be safely accelerated and decelerated at an extremely high rate.

It is still another object of the invention to provide a rotary spool drive for manipulating roll film or the like at extremely high speeds while providing for the stopping of the film at a selected point with an accuracy of a few thousandths of an inch.

It is still another object of this invention to provide a drive spool mechanism for carrying a film or the like and having internal means for automatically correcting any skewing of the film and for equally distributing the driving force on the two edges of the film.

Figure 3:
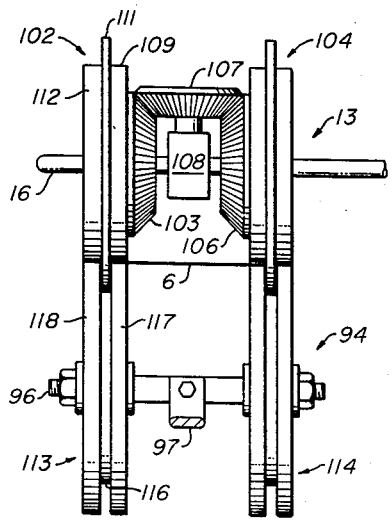

The invention, together with further objects and advantages thereof, will be best understood by reference to the following specification taken together with the accompanying drawing of which:

FIGURE 1 is a semi-schematic elevation view of a pair of drive spools carrying a film strip and showing a drive mechanism for the drums, portions of which are shown in section, FIGURE 2 is a plan view of the apparatus of FIGURE 1 and showing additional elements of the film transport mechanism, and FIGURE 3 is a view taken along line 3—3 of FIGURE 2 and showing structural details of one of the drive spools and associated elements.

Referring now to the drawing and more particularly to FIGURES 1 and 2 thereof in conjunction, there is shown a film driving mechanism 11 designed for use in an automatic scanning apparatus of the type used for scanning a film strip 6 carrying stereoscopic photos of nuclear events obtained from a bubble chamber. In this instance the film strip 6 carries three stereo photos of each nuclear event all of which are brought simultaneously before three spaced apart viewing positions shown as defined by lenses 7, 8 and 9 which may, for example, be associated with projection means. For this purpose it is necessary to start, stop and occasionally to reverse the film movement with rapidity and it is also important that the film be accurately positioned before the viewing positions 7, 8 and 9 upon stopping.

Considering now the structure for accomplishing the foregoing, two spools 12 and 13 are mounted in parallel relationship and are spaced apart one on each side of the viewing positions 7, 8 and 9 so that the film strip 6 which spans the spools extends across the viewing area. The spool 12 is mounted on a drive shaft 14 and spool 13 is mounted on a parallel shaft 16. To move the film 6 across the viewing positions 7, 8 and 9, shafts 14 and 16 are both rotated in the same direction through a first differential mechanism 17. The differential 17 is of standard design and includes a rotating differential housing 18 having a bevel drive gear 19 formed thereon and carrying a pair of opposed differential gears 21 each meshed with both of two side gears 22 and 23 which are coaxial with the bevel gear 19.

The housing 18 and integral bevel gear 19 is driven by a motor 26 through a pinion gear 24. The two side gears 22 and 23 are therefore driven in the same direction by means of the differential gears 21 which take up any differential action between the two side gears. The first side gear 22 is secured on a shaft 27 which is coupled to the drive shaft 14 of spool 12 by means of a bevel gear 28 secured to the end of shaft 27 which engages a bevel gear 29 mounted at a median point on the shaft 14. The second side gear 23 is similarly secured to a shaft 31 which is coupled to spool drive shaft 16 by means of a bevel gear 32 mounted on shaft 31 and a bevel gear 33 mounted at an end of the shaft 16. It will be noted that by means of this shafting and gearing, rotation of the bevel gear 19 by motor 26 will cause the two spools 12 and 13 to turn in the same direction thus moving the film strip 6 to the right for one direction of rotation of motor 26 and to the left for the other direction of rotation thereof. Current to operate the drive motor 26 is derived from a power source 34 through a reversing, speed varying control unit 36.

To maintain a constant tension on the film 6, a second differential assembly 37 is coupled to each spool drive shaft 14 and 16 and is of essentially the same construction as the first differential assembly 17 except that it is connected to impart oppositely directed torques to the two shafts. The second differential thus comprises a rotating housing 38 to which a bevel drive gear 39 is secured. Mounted in the housing 38 are two opposed differential gears 41. Also mounted in the housing 38, in coaxial relationship therewith, are two side gears 42 and 43 both of which mesh with the two differential gears 41 and are driven thereby as housing 38 is rotated by the bevel gear 39. Bevel gear 39 is in turn driven by a pinion gear 44 which is connected to a second motor 46. The second motor 46 is of the type delivering a constant torque and also is energized from power source 34 through a control unit 45 which may provide for adjusting the output torque of the motor to adjust the tension on film 6.

The side gear 42 of the second differential 37 is connected to a shaft 47 which has a bevel gear 48 at the end remote from the differential. Gear 48 meshes with a gear 50 secured to the end of spool drive shaft 14. The companion side gear 43 drives a shaft 49 having a bevel gear 51 at the outer end. The gear 51 meshes with a gear 52 secured to one end of an additional shaft 53 which is aligned with the shaft 16. At the other end of additional shaft 53 a gear 54 engages the previously described gear 32 which operates the gear 33 of shaft 16.

The above described shafting and gearing connects the torque applying motor 46 to the two film drive spools 12 and 13 in such a manner as to tend to turn the two spools in opposite directions. Therefore the second differential 37 will cause the two spools 12 and 13 to pull the film 6 in opposite directions until the film is tight at which point motion will cease providing the torque applied by motor 46 is adjusted to a value below the breaking point of the film. By this means a desired amount of tension may be maintained in the portion of the film 6 between the spools 12 and 13. The constant tension, moreover, is maintained irrespective of the primary movement of the film 6 brought about by operation of the first motor 26.

Conventional reel means may be used to feed the film strip 6 to the drive spools 12 and 13 and to take up the film after passage therebetween. Thus, and with reference to FIGURE 2, the film 6 passes from a first reel 57, pivoted at an axle 58, over a fixed position guide pulley 59 and over a second guide pulley 61 which is mounted on a tension arm 62 and back over another fixed guide pulley 63 located near the fixed pulley 59. The tension arm 62 is pivoted at one end 64 and is pulled by a spring 66 anchored at a stationary pin 67 to take up any sudden slack in film 6. The reel 57 is provided with suitable automatic take-up and release means, well known in the art, to automatically wind film 6 as the film becomes available or to reel out film 6 as film is demanded, an arm 62 merely accommodates sudden changes in film speed until the reel take-up and release means is activated.

From the guide roll 63 the film passes over another guide roll 68 and thence over the first spool 12. From spool 12 the film 6 traverses a series of guide rolls 69 so arranged and spaced that three views of the same event, located on the film in a fixed spaced relationship, will appear simultaneously before the three viewing positions 7, 8 and 9. The film strip 6 then traverses the second spool 13 and passes over a fixed position guide pulley 74 and another fixed guide pulley 76. The film 6 then passes over a guide pulley 77 located on a second tension arm 78 back to another fixed guide pulley 79 located near pulley 76 and thence to a second film take-up and release reel 81 pivoted at a fixed axle 82. The second tension arm 78 is pivoted at one end 83 and is held in tension by a spring 84 which is anchored at a stationary pin 85. The action of tension arm 78 is the same as the action of the first tension arm 62.

The film 6 is held against the spool 12 by means of an idler wheel 86 which is mounted on a lever 87 pivoted about a medial point 88, the wheel being rotatably mounted at one end of the lever. A pressure means such as spring 89 is secured to the other end of lever 87 and anchored at a point 91 thus pressing wheel 86 against the spool 12. A hook 92 and peg 93 provide for securing the wheel 86 in a position out of contact with spool 12 when it is desired to remove the film 6 or perform other operations. Similarly, a second idler wheel 94 presses the film 6 against the second drive spool 13 and is mounted to rotate on an axle 96. Wheel 94 is supported at one end of a lever 97, pivoted at a median point 98, and a spring 99 secured to the other end of the lever 97 and anchored to a peg 101 provides a means for holding the film 6 between the wheel and the spool 13. Lever 97 is also provided with a hook 92 which may be coupled to a post 93 to release pressure on the film at spool 13.

Considering now the internal construction of the drive spools 12 and 13 whereby a uniform pull against each side of the film strip 6 is assured, and with reference to FIGURE 3, the spool 13 is shown mounted on the shaft 16 and the idler wheel 94, mounted on the axle 96, is shown supported by the lever 97 as previously described. Spool 13 comprises a first film drive wheel 102 carrying a bevel gear 103 on the inner side and being rotatable on the shaft 16. A second drive wheel 104, similar to wheel 102, carries an integral bevel gear 106 and is also rotatable on the shaft 16. The two gears 103 and 106 are coaxial and of equal size and both mesh with a perpendicular intermediate gear 107 which rotates on an axle 108 which projects radially from shaft 16 and turns therewith. It will be seen that such structure provides a differential motion between the two side wheels 102 and 104 of the spool 13.

Each of the drive wheels 102 and 104 comprises an inner rubber disc 109, a thin metallic disc 111 of larger diameter than disc 109 and an outer rubber disc 112 of the same diameter as the disc 109 the discs being secured together in coaxial relationship. The thickness of the inner disc 109 is such that the disc may bear on the outer edge of film 6 without contacting the image area thereof. Outer disc 112 may be of about the same thickness as the inner disc 109.

The idler wheel assembly 94 comprises two coaxial wheels 113 and 114 both mounted to rotate freely on the shaft 96 independently of each other and being spaced apart a distance equal to the spacing of drive wheels 102 and 104 of spool 13. Wheels 113 and 114 may be made of rubber having the same thickness as wheels 102 and 104 of the drive spools and are provided with a central circumferential groove 116. Groove 116 must be of sufficient width and depth that the protruding edges of drive spool discs 111 may be accommodated therein as the wheels 102 and 104 of the spool 13 rotate in contact with the wheels 113 and 114 respectively of idler wheel 94. Owing to the groove 116, each of the wheels 113 and 114 has an inner circumferential area 117 which presses film 6 against the rim of the associated drive spool disc 109 and an outer circumferential area 118 which bears against the rim of the drive spool outer disc 112.

The spacing between the two drive spool wheels 102 and 104 is such that the film 6 will fit between the two metallic discs 111 with edges of the film resting on the rims of the two inner discs 109. The outer circumferential areas 118 of idler wheel 94 bear against the rims of the two outer discs 112 of the drive spool 13 and in this manner the two wheels 113 and 114 of idler 94 are driven by spool 13. The idler 94 thus contributes to the drive force applied to the film 6, half of the drive being provided by drive spool discs 109 and half by the idler rim areas 117. This in turn reduces the concentration of force at the edges of the film 6 and aids in avoiding damage thereto.

The first drive spool 12 and the first idler assembly 86 are constructed in the same way as the drive spool 13 and idler 94 respectively and operate in the same manner.

In operation, and with reference to all figures of the drawing, the film strip 6 is maintained in tension between the drive spools 12 and 13 by energizing the torque motor 46 which may, for example, apply a tension of two pounds pull on the film. If now the drive motor 26 is energized sufficiently to exert a one pound pull toward the left on film 6 at each of the two spools 12 and 13 the film will move toward the left at a fixed rate of speed after an initial period of acceleration and will be taken up on the reel 57. A reversal of the drive motor 26 will move the film 6 in the opposite direction or to the right where it is taken up on reel 81. Rate of acceleration and speed of transport may be varied as desired by means of an appropriate adjustment of control unit 45. In the example cited above, with two pounds tension exerted on film 6 between spools 12 and 13 by torque motor 46 the driving force toward the left at the spools as imparted by drive motor 26 should be less than two pounds on each spool so that the backward force on spool 13 will always be greater than the forward drive thus maintaining the film in tension. A net forward drive force on the right hand spool 13 in this instance of film movement to the left would possibly create a slack loop in the film 6 between spools 12 and 13 in the event of any film stoppage between the spools and such a condition might tear the film.

A brake may readily be provided to operate on the shaft of drive motor 26 if desired thus providing for quicker stopping of the film 6.

Although the invention has been disclosed with respect to a preferred embodiment it will be evident to those skilled in the art that many variations are possible within the spirit and scope of the invention. Therefore it is not intended to limit the invention except as defined by the following claims.

What is claimed is:

1. In a drive system for controlling movement of a film, belt, or the like which is carried on two rotatable drums, the combination comprising a first differential mechanism having a rotatable input shaft driving a pair of output shafts which are coupled to said drums to turn said drums in a similar angular direction, means for applying driving torque to said input shaft, a second differential mechanism having a second rotatable input shaft driving a second pair of output shafts which are coupled to said drums to apply oppositely directed torques thereto, and means for applying torque to said second input shaft.

2. In a drive system for operating two rotatable cylinders having a belt, film, or the like extending therebetween, the combination comprising a first motor driven differential mechanism connected to said two cylinders to rotate said cylinders in the same direction, a second differential mechanism also connected to said two cylinders and applying oppositely directed torques to each thereof and means for applying constant input torque to said second differential mechanism whereby said belt, film, or the like is maintained under a constant tension irrespective of the primary movement thereof.

3. In a drive system for controlling movement of a belt, film, or the like which is carried on two rotatable cylinders, the combination comprising a first differential mechanism having a torque input shaft driving a pair of output shafts which are each coupled to a separate one of said cylinders to turn said cylinders in a similar angular direction, a reversible drive motor coupled to said input shaft of said first differential mechanism, a second differential mechanism having a second torque input shaft driving a second pair of output shafts which are each coupled to a separate one of said cylinders to apply oppositely directed torques thereto, and a second motor coupled to said input shaft of said second differential for applying a constant limited torque thereto.

4. A drive system as described in claim 3, wherein said second motor is an electrical motor of a class adapted to being substantially stalled during normal operation of said drive system.

5. A drive system as described in claim 3, wherein said first drive motor applies a maximum torque to each of said cylinders which is less than the constant torque applied thereto by said second motor.

6. A drive means for rotating two spaced apart cylinders comprising, in combination, a first differential mechanism having a torque input shaft coupled to first and second output shafts and providing for differential motion therebetween, a first motor connected to said torque input shaft of said first differential mechanism, means coupling each of said output shafts of said first differential mechanism to a separate one of said cylinders for rotating both of said cylinders in the same direction, a second differential mechanism having a torque input shaft coupled to a first and a second output shaft and providing for differential motion therebetween, a second motor connected to said torque input shaft of said second differential and applying a constant limited torque thereto, and means coupling each of said output shafts of said second differential to a separate one of said cylinders to exert opposite torques on each thereof whereby an element coupling said two cylinders is maintained under constant tension throughout motion of said cylinders produced by said first motor.

7. Means for moving a film or the like comprising, in combination, a pair of rotatable drive axles, a first differential mechanism having a first torque input shaft driving a first pair of output shafts which are each coupled to a separate one of said drive axles to turn said axles in a similar angular direction, a second differential mechanism having a second torque input shaft driving a second pair of output shafts which are each coupled to a separate one of said drive axles to turn said axles in opposite angular directions, means for applying a limited constant torque to said input shaft of said second differential mechanism, a first pair of cylindrical spool members mounted coaxially on a first of said drive axles and being rotatable thereon, said first pair of spool members having spaced apart rims adapted to engage opposite edges of said film, a third differential mechanism connecting said first pair of spool members and coupling said first pair of spool members to said first drive axle, a second pair of cylindrical spool members mounted coaxially on the second of said drive axles and being rotatable thereon, said second pair of spool members also having spaced apart rims adapted to engage opposite edges of said film, and a fourth differential mechanism connecting said second pair of spool members and coupling said second pair of spool members to said second drive axle.

8. Means for moving a film or the like as described in claim 7 and wherein said third and fourth differential mechanisms each comprise first and second bevel gears disposed coaxially on the associated one of said drive shafts and each being secured to a separate one of the associated pair of spool members, a pin projecting radially from drive axle between said first and second bevel gears, and a third bevel gear journalled on said pin and engaging said first and second gears.

9. Means for moving a film or the like as described in claim 7 and comprising the further combination of an idler wheel assembly associated with each of said drive axles for holding said film against said rims of said first and second pairs of spool members each of said idler wheel assemblies comprising a pair of spaced apart independently rotatable wheels bearing against said rim portions of the associated pair of spool members, and means coupling each of said wheels to the adjacent one of said spool members to turn therewith whereby driving force is applied to both surfaces of each edge of said film.

10. A spool for manipulating roll film or the like comprising, in combination, a rotatable drive axle, a pair of spaced apart wheels journalled on said axle and having rims adapted to engage opposite edges of said roll film, first and second bevel gears secured coaxially to separate one of said wheels on the facing sides thereof, a pin projecting radially from said drive axle between said bevel gears, and a third bevel gear journalled on said pin and engaging each of said first and second bevel gears whereby a differential action is provided between the members driving opposite edges of said film.

References Cited in the file of this patent

UNITED STATES PATENTS

| | | |
|---|---|---|
| 2,542,917 | Fischer et al. | Feb. 20, 1951 |
| 2,883,122 | Bowen | Apr. 21, 1959 |